US012214361B2

(12) United States Patent
Schoepp et al.

(10) Patent No.: US 12,214,361 B2
(45) Date of Patent: Feb. 4, 2025

(54) TOOTH FOR FRAGMENTING APPARATUS AND SYSTEM

(71) Applicant: Rotochopper, Inc., St. Martin, MN (US)

(72) Inventors: Brian Schoepp, Colorado Springs, CO (US); Patrick Burg, Richmond, MN (US)

(73) Assignee: Rotochopper, Inc., St. Martin, MN (US)

( * ) Notice: Subject to any disclaimer, the term of this patent is extended or adjusted under 35 U.S.C. 154(b) by 247 days.

(21) Appl. No.: 17/308,325

(22) Filed: May 5, 2021

(65) Prior Publication Data

US 2021/0346893 A1 Nov. 11, 2021

Related U.S. Application Data

(60) Provisional application No. 63/020,382, filed on May 5, 2020.

(51) Int. Cl.
*B02C 4/08* (2006.01)
*B02C 18/18* (2006.01)

(52) U.S. Cl.
CPC ................ *B02C 4/08* (2013.01); *B02C 18/18* (2013.01)

(58) Field of Classification Search
CPC ................ B02C 13/28; B02C 13/2804; B02C 2013/2812; B02C 18/18; B02C 18/145; B02C 13/02; B02C 13/06; B02C 13/18
USPC .......................................................... 241/294
See application file for complete search history.

(56) References Cited

U.S. PATENT DOCUMENTS

| | | | | |
|---|---|---|---|---|
| 6,880,774 B2 * | 4/2005 | Bardos | B02C 18/184 | 241/242 |
| 9,021,679 B2 * | 5/2015 | Roozeboom | B02C 13/286 | 241/30 |
| 11,292,148 B2 * | 4/2022 | DiSabatino | A01G 23/091 | |
| 2002/0125353 A1 * | 9/2002 | Bardos | B02C 13/28 | 241/30 |
| 2003/0116665 A1 * | 6/2003 | Ragnarsson | B02C 18/145 | 241/294 |
| 2006/0226270 A1 * | 10/2006 | Kammerer | B02C 13/2804 | 241/197 |
| 2011/0226880 A1 * | 9/2011 | Marquardsen | B02C 13/06 | 241/195 |
| 2014/0217222 A1 * | 8/2014 | Greve | B02C 18/18 | 241/292.1 |
| 2015/0069160 A1 * | 3/2015 | Roozeboom | B02C 13/2804 | 241/294 |

* cited by examiner

*Primary Examiner* — Debra M Sullivan
*Assistant Examiner* — Matthew Stephens
(74) *Attorney, Agent, or Firm* — Billion & Armitage

(57) ABSTRACT

A tooth is made from a casting of one material. The tooth includes a working surface having a first edge and a second edge. The first edge has at least three teeth. The second edge also has at least three teeth. The working surface is provided with a welded overlay or a hardfaced welded overlay. The tooth can be attached to a mount on a rotating drum. The tooth is removably attached to the drum so that when it wears it can be replaced with another tooth. The rotating drum is part of a fragmenting machine.

17 Claims, 6 Drawing Sheets

TOOTH FOR FRAGMENTING APPARATUS AND SYSTEM

FIELD OF THE INVENTION

The invention generally relates to an improved replaceable tooth for a material fragmenting machine or a comminuting machine.

BACKGROUND OF THE INVENTION

Fragmenting or comminuting machines are designed to splinter and fragment materials using tremendous impacting forces. There are several types of comminuting machines. Some machines are gravity fed. They have chutes that are tilted toward a rotationally powered fragmentation device. Gravity is used, in whole or in part, to move materials into fragmentation device. Other comminuting machines have substantially horizontal beds. The material is fed to the fragmentation device using a conveyor belt or other means of advancing the material to the fragmentation device.

The fragmentation device includes a rotationally powered drum that includes teeth that grind or pulverize the incoming material. The rotationally powered drum is commonly known as a rotor or hammer mill, with peripherally mounted comminuting instruments, commonly referred to as teeth, hammers, cutters, and other names suggestive of their function, extending from the drum. These teeth revolve about an axis generally perpendicular to the flow of feed materials at speeds typically exceeding 1000 rpm's, though lower speeds are also found on such devices. When an object enters the radial path of a rotor tooth, it is carried into a plate or bar that is fixed in place and generally labeled an anvil. After the initial striking of the feed material by a rotor tooth, the anvil, located a short distance beyond the outer circumferential path of the teeth, facilitates a second stage of the fragmentation process, as the feed material is subjected to great shearing and pulverizing forces between the radially traveling tooth and the anvil. After the material passes beyond the anvil, it circulates between the teeth and a sizing screen, an apparatus concentrically surrounding a portion of the rotor with apertures roughly the size of the desired finished product. Frangible objects continue to be broken down between the teeth and screening apparatus until they are small enough to pass through these apertures.

Feedstock may encounter the rotor teeth several times before passing through a sizing aperture as a result of repeated ejection up into the feed opening and subsequent descent into the comminuting zone. Each encounter with the comminuting zone may result in the feedstock fragmenting into smaller pieces. In these situations, machine operators may not experience effective control over particle size and texture. Repeated and excessive contact between the rotor teeth and individual pieces of feed material also reduces production efficiency and increases component wear in proportion to output.

Wear on the rotor teeth is a concern that results in reductions in fragmenting efficiency and increases in costs related to maintenance and service to replace worn rotor teeth and tooth mounts. Known waste fragmenting machines may require heavy solid steel shafts and/or lock collars to hold tooth mounts and mounted teeth in position on the rotor. Such waste fragmenting machines require disassembly to replace the worn tooth mounts which is particularly labor intensive and costly.

The teeth impart massive impact loads. Teeth may become chipped, warped, or gouged, resulting in rotor imbalance and/or inability to properly secure teeth.

As a result, there remains a need for an improved tooth that has improved wear. A longer wearing tooth or set of teeth does not have to be replaced as often which saves maintenance costs while maintaining efficiencies for a longer period of time.

BRIEF DESCRIPTION OF THE DRAWINGS

Embodiments of the invention may be best understood by referring to the following description and accompanying drawings, which illustrate such embodiments.

In the drawings.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, Webster's Third New International Dictionary, Merriam-Webster Inc., Springfield, M A, 1993 and The American Heritage Dictionary of the English Language, Houghton Mifflin, Boston Mass., 1981.

Figure 1:
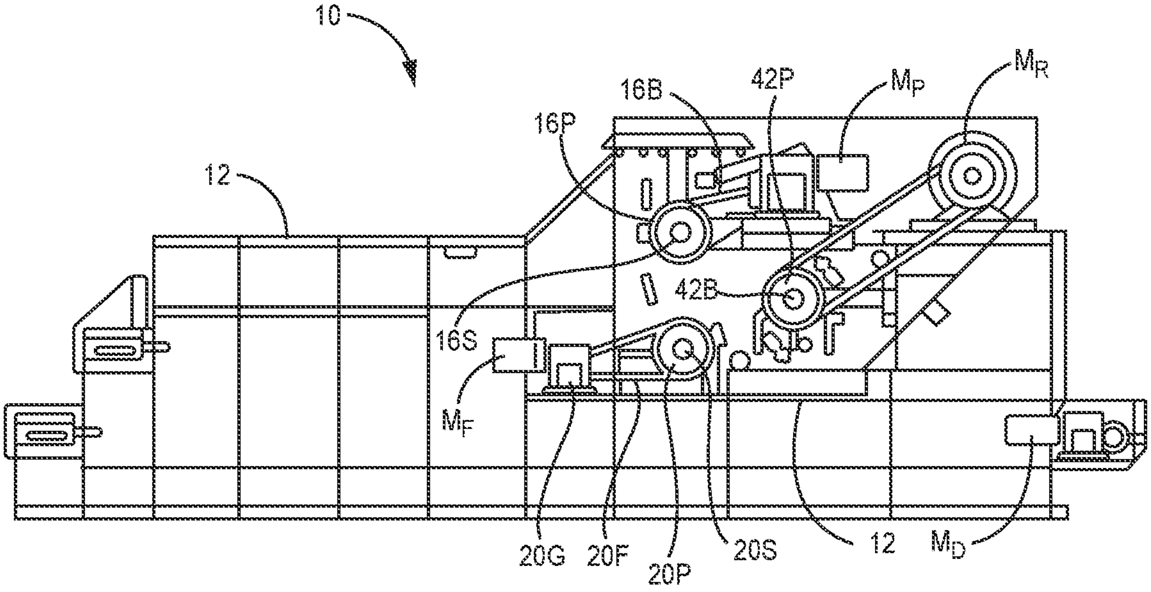
FIG. 1 is a cross-sectional view of a fragmenting machine according to an example embodiment.
Figure 2:
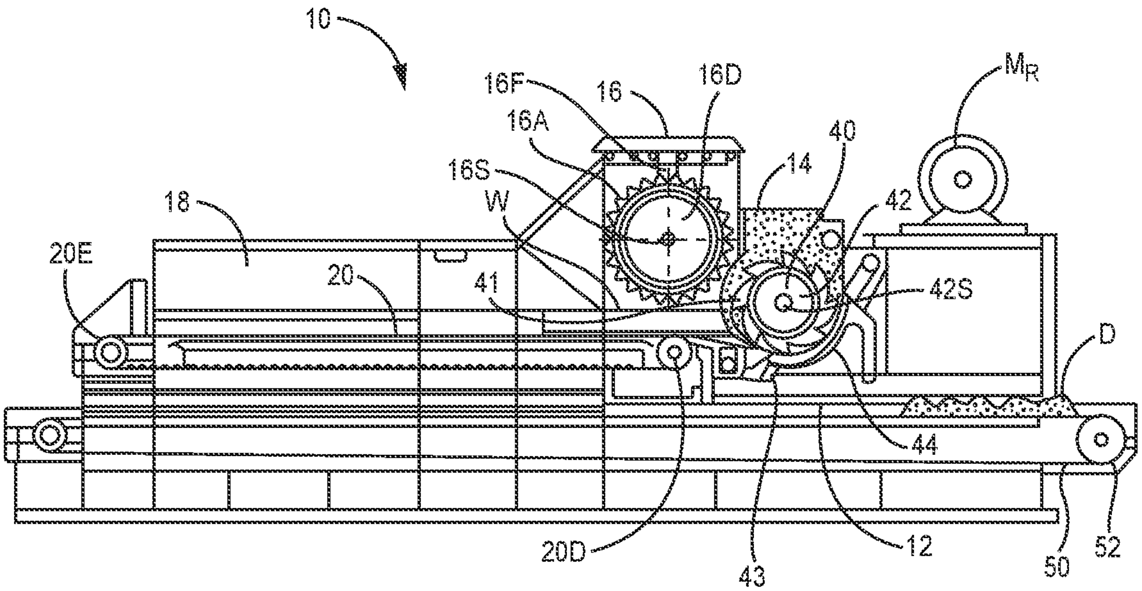
FIG. 2 is a cross-sectional view of a fragmenting machine according to an example embodiment.

FIGS. 1 and 2 provide complementary cross-sectional views of one embodiment of a fragmenting machine 10, also known as a horizontal grinder. The machine 10 is designed to splinter and/or fragment materials using high impact forces. The fragmenting machine 10 includes a frame 12 structurally sufficient to withstand the vigorous mechanical workings of machine 10. One embodiment of the machine 10 may be powered by several electrical motors generally prefixed by M, namely MR, MD, MP, and MF. These electric motors are illustrated as equipped with suitable drive means for powering the various working components, namely the feeding, fragmenting and discharging means of machine 10. It will be obvious to the skilled artisan, however, that the machine 10 may be powered by a variety of different power sources, e.g., internal combustion engines, diesel engines, hydraulic motors, industrial and tractor driven power take-off, etc.

In basic operational use in various embodiments, waste materials W may be power fed by a conveyer system to a fragmenting or grinding chamber 14 by a powered feed system 16 powered by a feed motor MF in cooperative association with a power feed rotor drum 16D powered by power feed motor MP.

Thus, one embodiment of the machine 10 may include a hopper 18 for receiving waste materials W and a continuously moving infeed conveyer 20 for feeding wastes W to the waste fragmenting or grinding chamber 14. An infeed conveyer 20 may be suitably constructed of rigid apron sections hinged together and continuously driven about drive pulley 20D and an idler pulley 20E disposed at an opposing end of the conveyer 20. The conveyer 20 may be operated at an apron speed of about 10 to about 30 feet per minute, depending upon the type of waste material W. The travel rate or speed of infeed conveyer 20 may be appropriately regulated through control of gearbox 20G. Feed motor MF in cooperative association with gear box 20G, apron drive pulley 20P, chain 20F, and apron drive sprocket 20D driven about feed shaft 20S serves to drive continuous infeed conveyer 20 about feed drive pulley 20D and idler pulley 20E.

Power feed system 16 is driven by motor MP and in cooperative association with the infeed conveyer 20, driven by motor MF, uniformly feeds and distributes bulk materials, W, such as cellulose-based materials to the fragmenting or grinding chamber 14. Power feed system 16 positions and aligns the materials W for effective fragmentation by the fragmenting rotor 40. The power feed system 16 comprises, in one embodiment and as illustrated, a power feed wheel or rotor drum 16D equipped with projecting feeding teeth 16A positioned for counterclockwise rotational movement about power feed wheel 16D. Power feed wheel 16D may be driven by power feed shaft 16S which in turn is driven by chain 16B, drive sprocket 16P and motor MP. The illustrated embodiment further comprises arm 16F which holds power feed wheel 16D in position.

A rotary motor MR serves as a power source for powering a fragmenting rotor 40 that operates within the fragmenting or grinding chamber 14. The fragmenting and grinding are accomplished, in part, by shearing or breaking teeth 500 which rotate about a cylindrical drum 42 and exert a downwardly and radially outward, pulling and shearing action upon the waste material, W, as it is fed onto a striking bar 43 and sheared thereupon by the teeth 500. Within some machines, the rotor may rotate upward into the feed material. The shearing teeth 500 project generally outwardly from the cylindrical drum 42, which is typically rotated at an operational speed of about 1800-2500 r.p.m, though, as discussed above, other r.p.m. ranges are well within the scope of the present invention. The fragmenting rotor 40 is driven about a power shaft 42S, which is in turn powered by a suitable power source such as motor MR. Motor MR is drivingly connected to power shaft pulley 42P which drivingly rotates power shaft 42S within power shaft bearing 42B. The rotating teeth 500 thus create a turbulent flow of the fragmenting wastes W within the fragmenting chamber 14.

Initial fragmentation of the material, W is, in one embodiment, accomplished within the dynamics of a fragmenting or grinding chamber 14 which may comprise a striking bar 43 and a cylindrical drum 42 equipped with a dynamically balanced arrangement of the shearing or breaker teeth 500. The striking bar 43 serves as a supportive anvil for shearing material W fed to the fragmenting zone 4. Teeth 500 are staggered upon cylindrical drum 42 to facilitate dynamic balancing of rotor 40. Rotor 40, generally operated at an operational rotational speed of about 1800-2500 r.p.m., rotates about shaft 42S. Material fragmented by the impacting teeth 500 is then radially propelled along the curvature of the screen 44. Screen 44, in cooperation with the impacting teeth 500, serves to refine the material W into a desired particle size until ultimately fragmented to a sufficient particle size so as to pass through screen 44 for collection and discharge by discharging conveyor 50. A discharging motor MD serves as a power source for powering a discharger 52, illustrated as a conveyor belt and pulley system, wherein the discharger 52 conveys processed products D from the machine 10.

The power feed system 16 helps to maintain a substantially consistent feed rate to the fragmenting chamber and rotor therein. Stabilization of the feed material prior to entry into the fragmenting chamber is essential to fragmentation speed and efficiency. The need for feed stability in a fragmenting machine is relative to the size and consistency of the feed material, as well as the rotor r.p.m. and torque. Thus, the power feed system 16, also referred to as a pre-crusher, power feeder, power feed drum, power feed roll or roller, or powerfeed, is an integral component of an efficient horizontal grinder.

A typical power feed wheel 16D usually comprises serrated plates, cleats or other elements, represented in FIG. 2 as power feed teeth 16A, that function to grip the feed material as it is delivered to the fragmenting chamber and rotor therein.

Maintenance of a certain downward pressure of the power feed wheel 16D on the feed material will help regulate the speed with which the material enters the fragmenting chamber and encounters the rotor. This downward pressure assists, inter alia, in preventing the fragmenting rotor 40 from pulling the feed material in too quickly. The downward pressure of the power feed wheel 16D stabilizes the feed material by providing a level of compression and lateral movement of the feed material prior to encountering the rotor, thus improving the efficacy of fragmentation within the fragmenting chamber 14. power feed device described is not a required element.

Figure 3:
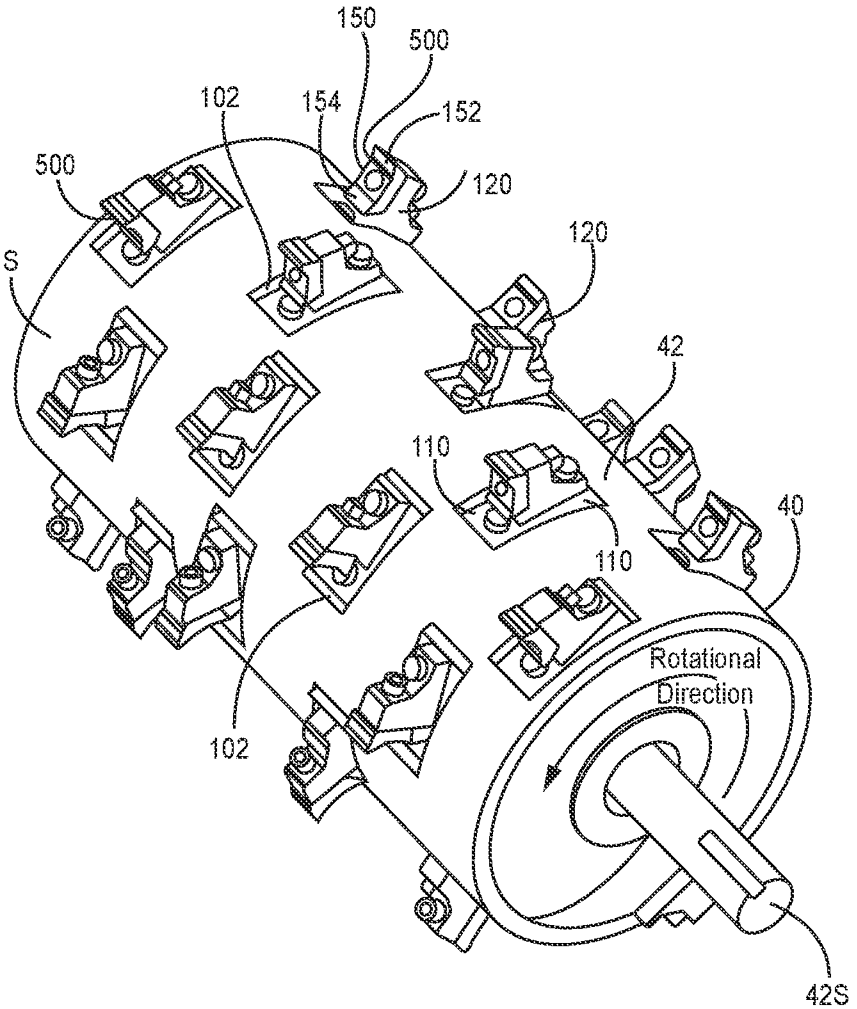
FIG. 3 is a perspective view of rotor of a fragmenting machine that carries the tooth, according to an example embodiment.
Figure 4:
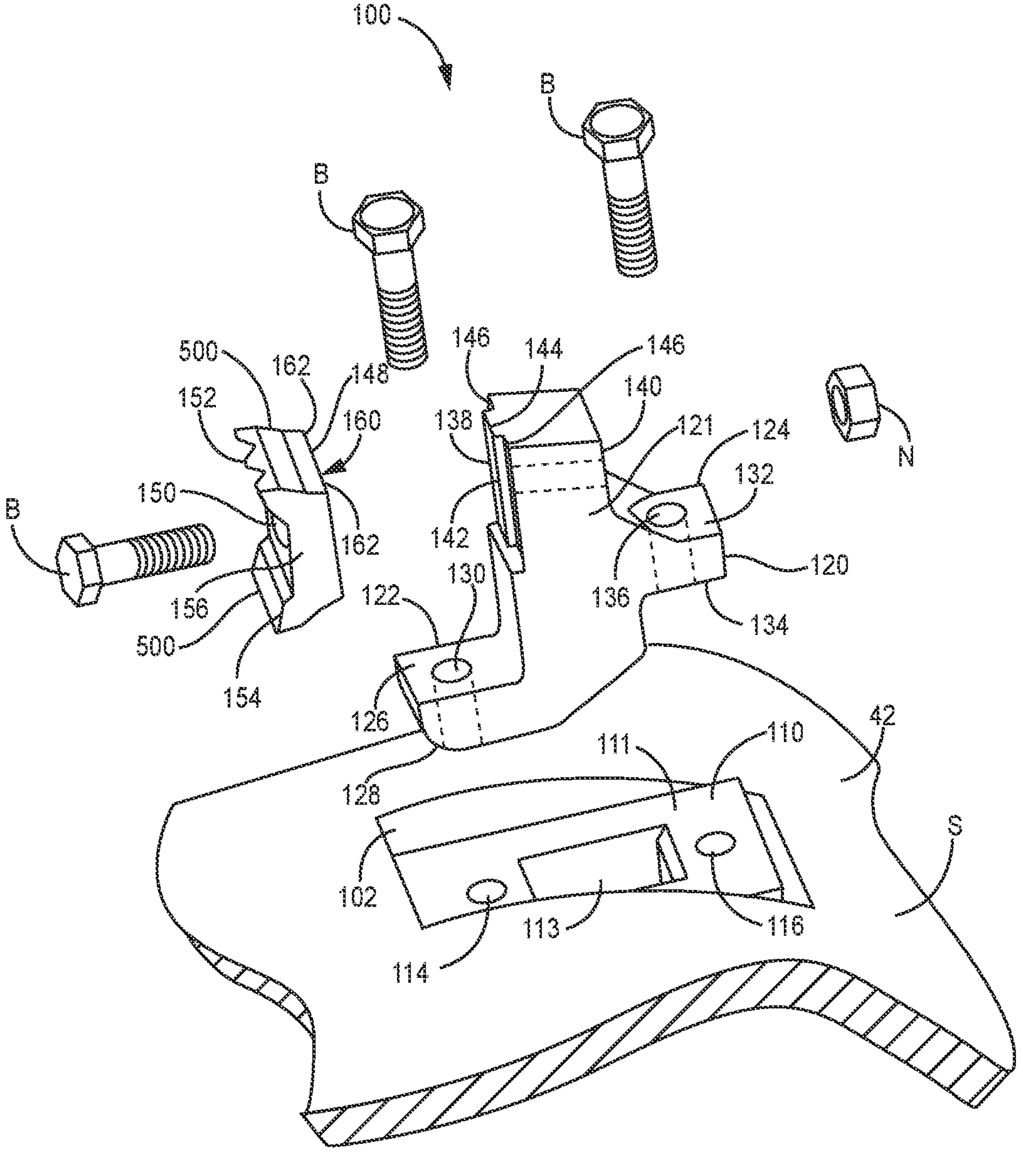
FIG. 4 is an exploded view of a drum, a mount, and a tooth according to an example embodiment.

FIGS. 3 and 4 illustrate an example embodiment of a rotating fragmentation system 100, according to an example embodiment. The rotating fragmentation system 100 includes a plurality of spaced apart cutouts 102 in the outer surface S of cylindrical drum 42, a holder 110 is attached to an associated cutout 102, a mount 120 attached to an associated holder 110, and a tooth 500 attached to each mount 120.

FIG. 3 provides a perspective view of the fragmenting rotor 40 with a plurality of teeth 500 mounted in a spaced apart configuration upon cylindrical drum 42 to facilitate dynamic balancing of rotor 40 and to provide full coverage on the rotor 40. It should be noted that many variations of tooth 500 positioning and spacing on cylindrical drum 42 are possible, and that each such variation is within the scope of the present invention. The rotational direction of the drum 42 is shown by the arrow in FIG. 3.

Cylindrical drum 42 has an outer surface S with a plurality of spaced apart cutouts 102. Within each cutout 102, a holder 110 is attached to the drum 42. The holder 110 comprises an upper surface 111, a lower surface (major surface substantially parallel to upper surface 111 but not shown) and a central mount aperture 113. Holder 110 further comprises a leading threaded opening 114 and a trailing threaded opening 116. Threaded fasteners, such as bolts, engage the leading threaded opening 114 and a trailing threaded opening 116. As illustrated, the cutouts 102 and holders 110 are rectangularly shaped. Other cutout shapes could be used and are within the scope of the present invention.

As best illustrated in the exploded view of FIG. 4, mount 120 is removably attached to holder 110. The mount includes a central body 121. The central body 121 includes a lower arm 122 and an upper arm 124. The lower arm 122 includes an upper surface 126 and a lower surface 128, with an aperture 130 therethrough. Upper surface 126 may be flat as illustrated. The upper arm 124 comprises an upper surface 132 and a lower flat surface 134, with an aperture 136 therethrough. The central body 121 further comprises a leading surface 138 and a trailing surface 140, with an aperture 142 therethrough. As shown, leading surface 138 comprises a central raised section 144 with flat step sections 146 on each side of the central raised section 144. The raised section serves as a key to ensure proper alignment of the tooth 500 which has a groove therein for alignment and attachment to the central raised section 144 of the mount 120. Other alignment geometries can be employed.

Each tooth 500 is attached to the leading surface 138 of a mount 120. Exemplary tooth 500 comprises a body having a generally flat leading middle surface 150 with an upper angled grinding surface 152 adjacent the middle surface 150 and a lower angled grinding surface 154 adjacent the middle surface 150, with the leading middle surface 150 therebetween as illustrated and a back surface 148 having a geometry. The flat leading middle surface 150 of each tooth 500 comprises an aperture 156 therethrough which is aligned with mount 120 aperture 142 when properly positioned for attachment to the mount 120.

As described above, leading surface of the mount 138 may comprise a geometry that is complementary to the raised central section 144 with adjacent side-stepped sections 146. Each tooth 500 may comprise complementary structure on its back surface 148. Thus, the back surface 148 of the illustrated embodiment of tooth 500 comprises a central groove 160 disposed vertically along the back surface 148, with adjacent side surfaces 162. This central groove 160 may engage and receive the complementary raised central section 144 of the mount 120, and the adjacent side surfaces 162 may engage the respective and complementary adjacent side stepped sections 146 of the illustrated embodiment of mount 120, thus ensuring proper alignment and assisting in keeping the tooth 500 in proper position during fragmenting. As illustrated, a bolt is threaded through aligned apertures 156 and 142, tightened against the trailing surface 140 of mount 120 with nut N to attach tooth 500 to mount 120. With some tooth styles, the tooth 500 may be threaded to accept a bolt inserted from the back of the mount 120.

Figure 5:
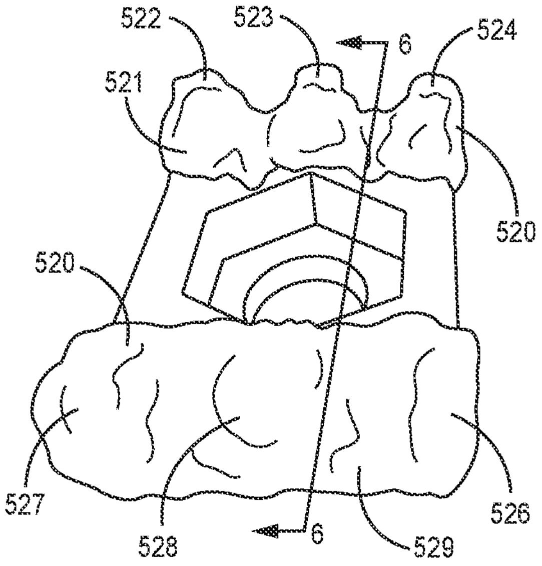
FIG. 5 is a perspective view of a tooth according to an example embodiment.
Figure 6:
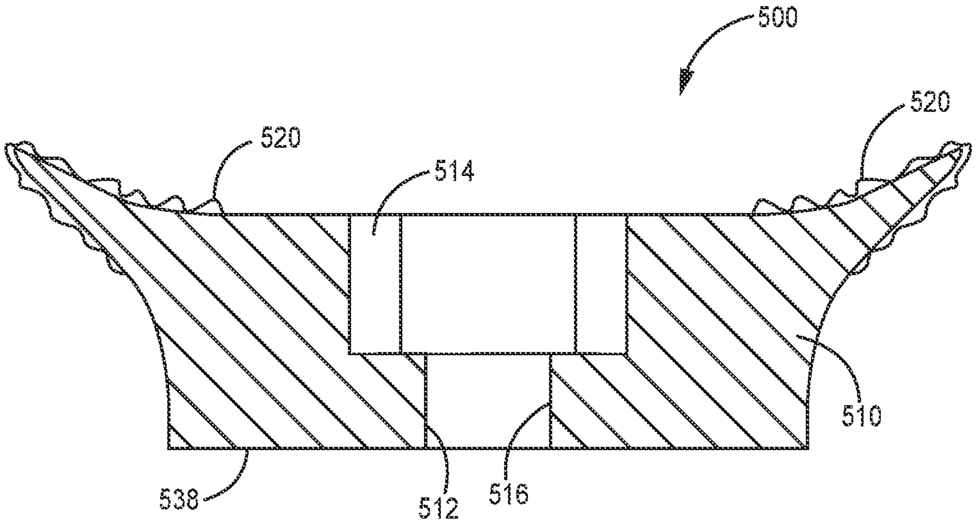
FIG. 6 is a cross-sectional view along cutline 6-6 of FIG. 5, according to an example embodiment.

FIG. 5 is a perspective view of a tooth 500, according to an example embodiment. FIG. 6 is a cross sectional view of a tooth 500 along line 6-6 in FIG. 5. The tooth 500 will now be discussed in more detail by referring to both FIGS. 5 and 6, Tooth 500 includes a main body 510 having at least one opening 512 therein. The main body 510 further includes an attachment surface 538 and a working surface 520. The attachment surface 538 is for attaching the tooth 500 to the mount 120. More specifically, the attachment surface 538 is for attaching the tooth 500 to the leading surface 138 of the mount 120. The attachment surface 538 has a footprint 501. The footprint 501 is bounded by the outer perimeter of the attachment surface 538. The working surface 520 is formed as part of the main body 510. The working surface 520 includes a first edge 521 having at least three cutting claws, 522, 523, 524 and a second edge 526 having at least three cutting claws 527, 528, 529. Each of the cutting claws 522, 523, 524, 527, 528, 529 extends beyond the footprint 501 of the attachment surface 538. The main body 510 and the cutting claws 522, 523, 524, 527, 528, 529 are formed integrally. In other words, the tooth 500 can be formed from one casting, in one example embodiment. The first edge 521 having at least three cutting claws 522, 523, 524, and the second edge 526 having at least three cutting claws 527, 528, 529 are all one casting. The main body 510 and the at least three claws on the first edge 522, 523, 524 and the at least three claws 527, 528, 529 on the second edge 526 are formed of the same material. The material is generally a metal. In the example embodiment discussed above, the tooth 500 is formed by casting. It should be noted that the tooth 500 can also be forged, machined or formed by any other means in other example embodiments.

Now looking at FIGS. 4-6, the at least one opening 512 in the main body 510 is shaped to receive a fastener (shown as element B in FIG. 4). The fastener B is for removably attaching the tooth 500 to the mount 120. In the embodiment shown, the opening is shaped to receive a large hex head bolt as the fastener B. The opening includes a hex shaped cavity 514 which captures the hex head of the bolt or fastener B. The opening 512 also includes a cylindrical opening 516 for the shaft of the bolt or fastener B. If the opening 512 is sufficiently large, the tooth 500 can be cast with the opening 512 in the casting. As a result, manufacturing does not require machining of the opening 512. In some embodiments, machining may be required on the attachment surface 538 of the tooth 500 to make sure it mates properly to the corresponding surface 138 on the holder.

A metallic coating is placed on at least a portion of the working surface 520. In one embodiment, the portion provided with the metallic coating includes at least three claws 522, 523, 524 on the first edge 521 and the at least three claws 527, 528, 529 on the second edge 526. In another embodiment, the working surface 520 is provided with the metallic coating. In one example embodiment, substantially the entire exterior of the tooth 500 is provided with the metallic coating, except the attachment surface 538.

In one embodiment, the metallic coating is a welded overlay. Weld overlays are metallic coatings welded directly onto the substrate. The high-heat welding process forms a molecular-level bond with the base metal, essentially alloying the coating to the substrate at the interface. The result is a durable, almost completely nonporous and impenetrable coating with excellent resistance to high-stress gouging wear.

Weld overlays are typically applied in greater thicknesses than thermal sprayed coatings. As such, substantial amounts of material may be applied in a comparatively short time. The weld alloying process makes the applied material an integral part of a component's physical structure. By nature of the process, highly customized surfaces may be developed by layering and alloying several different materials. Once a coating has been welded onto a substrate, it is virtually impervious to the problems of coating separation, lifting, and peeling that can sometimes occur in thermal sprayed coatings under high stress. The alloyed material also combines the high resistance to sliding abrasion offered by thermal sprayed coatings with an equally exemplary resistance to gouging and plowing wear.

During weld overlaying, the parts are exposed to high surface temperatures (in excess of 2,300° F.) and must be resistant to thermal deformation. Consideration needs to be given to any prior heat treatment of the substrate material and the thermal effects of the welding process on substrate metallurgy. Careful control of preheat, interpass and post-weld heat treat temperatures may be required for certain substrate alloys in order for the weld overlay process to be successful. Coefficients of expansion for the base metal and applied coating should be similar. Dissimilar coefficients can lead to cracking in the coating and possible damage to the component as the material and substrate cool.

In one embodiment, the metallic coating is a hardfaced weld overlay. The tooth 500 in FIG. 5 has a hardfaced overlay. Hardfaced weld overlays are applied in substantial thicknesses (typically >0.100"). A hardfaced overlay has significant resistance to gouging and plowing wear.

A tooth made from a casting of one material and then provided with a welded overlay or a hardfaced welded overlay is not as sharp as a tooth with added carbide inserts. However, the claw type tooth is able to fragment materials and last longer in a fragmentation device or a fragmentation environment. The claws 522, 523, 524, 527, 528, 529 present a larger surface area or working area for fragmenting materials. The tooth 500 with a metal overlay or a hardfaced metal overlay is less costly to manufacture. The cast tooth 500 does not have to be machined so that it can receive an insert, such as a carbide insert. The tooth 500 is, therefore, easier and less costly to manufacture. It also wears longer so that the teeth 500 on a fragmentation device do not have to be replaced as often. The result is less downtime for a fragmentation device.

Of course, adding the tooth or teeth 500 to holders on a drum forms a rotational fragmenting device, such as the fragmenting rotor 40. Additionally, adding a feed chute and other chambers and screens also forms a more extensive fragmentation device 10.

The present invention should not be considered limited to the particular examples described above, but rather should be understood to cover all aspects of the invention. Various modifications, equivalent processes, as well as numerous structures to which the present invention may be applicable will be readily apparent to those of skill in the art to which the present invention is directed upon review of the present specification.

The invention claimed is:

1. A fragmentation apparatus comprising:
- a cylindrical drum having an outer surface with a plurality of spaced apart cutouts therein, the cylindrical drum configured to rotate in a rotational direction;
- a plurality of holders attached to the cutouts on the cylindrical drum;
- a plurality of mounts attached to the plurality of holders on the cylindrical drum, each holder positioned within a cutout;
- a tooth including:
  - a main body, the main body including:
    - an attachment surface attached to at least one of the plurality of mounts, the outer perimeter of the attachment surface defining a footprint for the tooth, the footprint bounded by the outer perimeter of the attachment surface; and
    - a leading working surface formed as part of the main body, the leading working surface facing the rotational direction;
  - a first edge having at least three cutting claws, each of the three cutting claws extending beyond the footprint of the tooth as defined by the outer perimeter of the attachment surface, the first edge having a first trailing surface facing opposite from the rotational direction, each of the three cutting claws including a portion of the leading working surface and a portion of the first trailing surface; and
  - a second edge having at least three cutting claws, each of the three cutting claws, extending beyond the footprint of the tooth as defined by the outer perimeter of the attachment surface, the second edge having a second trailing surface facing opposite from the rotational direction, each of the three cutting claws including a portion of the leading working surface and a portion of the second trailing surface.

2. The fragmentation apparatus of claim 1, further comprising a metallic coating covering a portion of the tooth.

3. The fragmentation apparatus of claim 1, further comprising a metallic coating covering the leading working surface associated each of the at least three claws of the first edge; and the first trailing surface associated with each of the at least three claws of the first edge.

4. The fragmentation apparatus of claim 3 wherein the metallic coating is a welded overlay.

5. The fragmentation apparatus of claim 1, further comprising a metallic coating covering the leading working surface associated each of the at least three claws of the first edge; the first trailing surface associated with each of the at least three claws of the first edge: the leading working surface associated each of the at least three claws of the second edge; the second trailing surface associated with each of the at least three claws of the second edge.

6. The fragmentation apparatus of claim 5 wherein the metallic coating is a welded overlay.

7. The fragmentation apparatus of claim 1 wherein the at least three claws on the first edge are formed by making at least two openings in the first edge.

8. The fragmentation apparatus of claim 7 wherein the at least two openings pass through the first edge.

9. The fragmentation apparatus of claim 1 wherein the at least three claws on the first edge are formed by making at least two openings in the first edge; and the at least three claws of the second edge are formed by making at least two openings in the second edge.

10. The fragmentation apparatus of claim 1 wherein the mount is formed by casting.

11. The fragmentation apparatus of claim 1 wherein the mount is formed by forging.

12. The fragmentation apparatus of claim 11 further comprising a metallic coating covering a portion of the tooth.

13. The fragmentation apparatus of claim 11 further comprising a metallic coating covering the leading working surface associated with at least one of the plurality of claws of the first edge; and the first trailing surface associated with at least one of the plurality of claws of the first edge.

14. The fragmentation apparatus of claim 13 wherein the metallic coating is a welded overlay.

15. The fragmentation apparatus of claim 1 wherein the mount is formed by machining.

16. A fragmentation apparatus comprising:

a cylindrical drum having an outer surface with a plurality of spaced apart cutouts therein, the cylindrical drum configured to rotate in a rotational direction;

a plurality of holders attached to the cutouts on the cylindrical drum;

a plurality of mounts attached to the plurality of holders on the cylindrical drum, each holder positioned within a cutout;

a tooth including:

a main body, the main body including, an attachment surface attached to at least one of said mounts, the outer perimeter of the attachment surface defining a footprint for the tooth, the footprint bounded by the outer perimeter of the attachment surface; and a leading working surface formed as part of the main body, the leading working surface facing the rotational direction;

a first edge having a plurality of cutting claws, each of the plurality of cutting claws extending beyond the footprint of the tooth as defined by the outer perimeter of the attachment surface, the first edge having a first trailing surface facing opposite from the rotational direction, each of the plurality of cutting claws including a portion of the leading working surface and a portion of the first trailing surface; and a second edge having a plurality of cutting claws, each of the plurality of cutting claws, extending beyond the footprint of the tooth as defined by the outer perimeter of the attachment surface, the second edge having a second trailing surface facing opposite from the rotational direction, each of the plurality of cutting claws including a portion of the leading working surface and a portion of the second trailing surface.

17. The fragmentation apparatus of claim 16 further comprising a metallic coating covering the leading working surface associated at least one of the plurality of claws of the first edge; the first trailing surface associated at least one of the plurality of claws of the first edge: the leading working surface associated with at least one of the plurality of claws of the second edge; and the second trailing surface associated with at least one of the plurality of claws of the second edge.

* * * * *